United States Patent
Odajima et al.

(10) Patent No.: US 7,721,528 B2
(45) Date of Patent: May 25, 2010

(54) EXHAUST GAS PURIFYING APPARATUS FOR INTERNAL COMBUSTION ENGINE

(75) Inventors: Akira Odajima, Wako (JP); Yuzuru Koike, Wako (JP); Yoshitaka Takasuka, Wako (JP); Atsushi Izumiura, Wako (JP); Hiroshi Nagashima, Wako (JP); Kiyoshi Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1114 days.

(21) Appl. No.: 11/368,527

(22) Filed: Mar. 7, 2006

(65) Prior Publication Data

US 2006/0196167 A1    Sep. 7, 2006

(30) Foreign Application Priority Data

Mar. 7, 2005    (JP) .............................. 2005-062366
Aug. 3, 2005    (JP) .............................. 2005-224809

(51) Int. Cl.
*F01N 3/00*    (2006.01)
(52) U.S. Cl. .............................. 60/277; 60/297; 60/311

(58) Field of Classification Search ................... 60/276, 60/277, 297, 311
See application file for complete search history.

(56) References Cited

U.S. PATENT DOCUMENTS 6,966,178 B2 *    11/2005    Saito et al. ..................... 60/295

FOREIGN PATENT DOCUMENTS

| DE | 199 59 870 A1 | 6/2001 |
|---|---|---|
| FR | 2 795 132 A1 | 12/2000 |
| FR | 2795132 | * 12/2000 |
| JP | 2004-308454 | 11/2004 |

* cited by examiner

*Primary Examiner*—Thomas E Denion
*Assistant Examiner*—Diem Tran
(74) *Attorney, Agent, or Firm*—Arent Fox LLP

(57) ABSTRACT

An exhaust gas purifying apparatus for an internal combustion engine including a first filter and a second filter. The first filter traps particulates in exhaust gases from said engine. The second filter is provided for failure detection and disposed downstream of the first filter. The trapping state of the second filter is detected and a filtering capability of the first filter is diagnosed based on the detect trapping state of the first filter.

1 Claim, 11 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to the exhaust gas purifying apparatus having a filter (DPF: Diesel Particulate Filter) for trapping particulates (particulate matter) in exhaust gases of the internal combustion engine.

2. Description of the Related Art

A technique of providing a DPF which traps particulates in exhaust gases in the exhaust system of a diesel internal combustion engine and reducing an emission amount of particulates is conventionally and widely used. If a failure such as a crack or a hole occurs in the filter element of the DPF, the filtering capability of the DPF will be deteriorated and the emission amount of particulates will increase. Therefore, it is necessary to quickly detect such failure.

Japanese Patent Laid-open No. 2004-308454 shows a method of providing a pressure sensor on the downstream side of the DPF, calculating a difference between the maximum value and the minimum value, i.e., a pulsation amplitude, of the detected pressure during engine operation, and determining that a failure occurs when the calculated pulsation amplitude is outside of a predetermined range.

According to the technique shown in Japanese Patent Laid-open No. 2004-308454, a leak amount of particulates due to the failure cannot be detected. Therefore, it is difficult to satisfy the demand of detecting a failure before the leak amount of particulates exceeds a predetermined amount due to reduction in the particulate trapping capacity of the DPF. Further, according to the technique shown in Japanese Patent Laid-open No. 2004-308454, complicated calculations are necessary for monitoring and analyzing the pulsation amplitude of the exhaust pressure.

On the other hand, it is considered to be effective to provide a particulate sensor that directly detects leaked particulates on the downstream side of the DPF. However, development of such sensor has not yet been completed.

SUMMARY OF THE INVENTION

The present invention is made contemplating the above-described points. An object of the present invention is to provide an exhaust gas purifying apparatus which can accurately detect a state of a failure of the DPF with a comparatively simple configuration.

In order to attain the above object, the present invention provides an exhaust gas purifying apparatus for an internal combustion engine (1). The exhaust gas purifying apparatus includes first filtering means (14), second filtering means (15), trapping state detecting means, and filter diagnosing means. The first filtering means (14) traps particulates in exhaust gases from the engine. The second filtering means (15) is provided for failure detection, and disposed downstream of the first filtering means (14). The trapping state detecting means detects a trapping state of the second filtering means (15). The filter diagnosing means diagnoses a filtering capability of the first filtering means (14) based on a detection result (GDPFS) of the trapping state detecting means.

With this configuration, the trapping state of particulates in the second filtering means is detected, and the filtering capability of the first filtering means is diagnosed based on the detected trapping state. If a crack or a hole is present in the first filtering means, the particulates in the exhaust gases pass through the first filtering means, and are trapped by the second filtering means disposed downstream of the first filtering means. Therefore, it can be determined whether a crack or a hole is present in the first filtering means, by detecting the trapping state of the second filtering means. Further, an amount of the particulates that have passed through the first filtering means can be detected according to the trapping state of the second filtering means. Consequently, the failure state of the first filtering means can be accurately detected with a comparatively simple configuration. That is, the amount of particulates trapped by the second filtering means corresponds to the amount (a leak amount) of particulates that have passed through the first filtering means. Therefore, it is possible to surely detect the failure before the leak amount exceeds a predetermined limit value.

Preferably, the trapping state detecting means includes a temperature sensor (22) for detecting a temperature (TDPFS) of the second filtering means (15), and detects the trapping state (GDPFS) of particulates in the second filtering means (15), based on the temperature (TDPFS) detected by the temperature sensor (22) during a filter regeneration process for burning the particulates trapped in the first filtering means (14).

With this configuration, the trapping state of the second filtering means is detected based on the temperature of the second filtering means detected when performing the filter regeneration process in which the trapped particulates are burned. When performing the filter regeneration process, the particulates accumulated in the first filtering means and the second filtering means burn, and the temperature of the second filtering means rises. An amount of rise in the temperature of the second filtering means changes depending on the amount of particulates accumulated in the second filtering means (the amount of temperature rise is considered to be substantially proportional to the amount of accumulated particulates). Accordingly, an accurate trapping state of particulates except the influence of ashes of the burnt particulates, i.e., an accurate amount of the particulates trapped in the second filtering means, can be detected.

Preferably, the trapping state detecting means includes a pressure difference sensor (25) for detecting a pressure difference (DPDPFS) between a pressure on the upstream side of the second filtering means (15) and a pressure on the downstream side of the second filtering means (15), and detects the trapping state of particulates in the second filtering means (15), based on the output (DPDPFS) of the pressure difference sensor (25).

With this configuration, the trapping state of the second filtering means is detected based on the pressure difference between the upstream pressure and the downstream pressure with respect to the second filtering means. Therefore, the filtering capability of the first filtering means can be diagnosed even when the filter regeneration process is not performed.

Preferably, the trapping state detecting means also detects a trapping state of the first filtering means (14), and the filter diagnosing means calculates a trapping rate (CE) of the first filtering means (14), based on the respective trapping states (GDPFMF, GDPFS) of the first filtering means (14) and the second filtering means (15).

With this configuration, the particulate trapping state of the first filtering means is also detected and the trapping rate of the first filtering means is calculated based on the trapping states of the first and second filtering means. The sum of the amount of particulates trapped in the first filtering means and the amount of particulates trapped in the second filtering means is considered to be a total amount of particulates emitted from the engine. Therefore, the trapping rate can be calculated from the total amount of particulates and the amount of particulates trapped in the first filtering means. By calculating the trapping rate of the first filtering means, it becomes possible to determine a degree of the failure (whether the failure is serious or slight).

The parameter indicating the trapping state of the second filtering means includes not only the amount (GDPFS) of the trapped particulates or the total amount (GDPFTS) of particulates including ashes accumulated in the second filtering means, but the temperature rise amount (DTDPFS) detected during the filter regeneration process or the detected pressure difference (DPDPFS). Further, the "trapping state" includes a state of whether the second filtering means traps some particulates or no particulate.

DETAILED DESCRIPTION OF THE PREFERRED EMBODIMENTS

Preferred embodiments of the present invention will now be described with reference to the drawings.

First Embodiment

Figure 1:
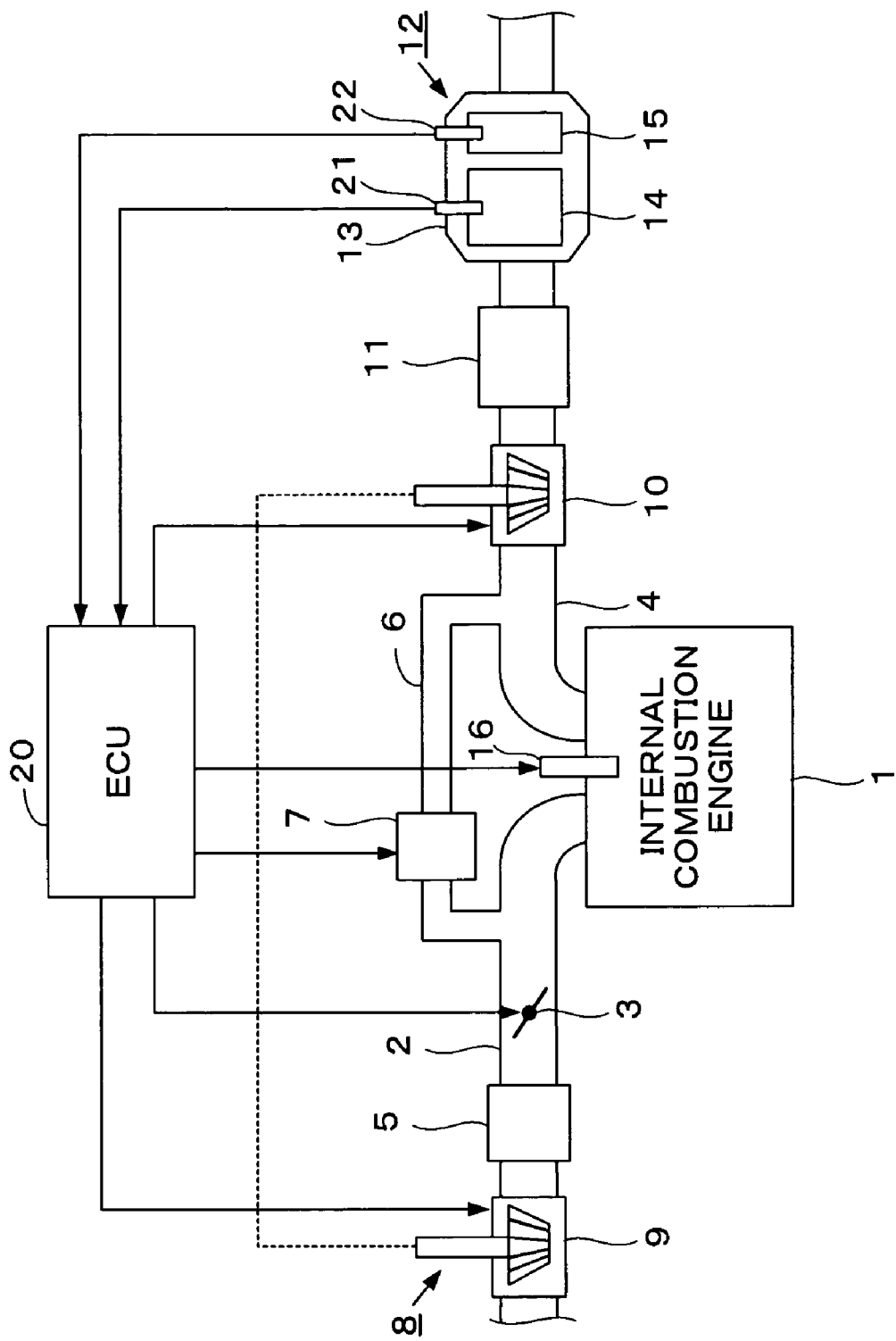
FIG. 1 is a schematic diagram showing a configuration of an internal combustion engine having an exhaust gas purifying apparatus and a control system therefor according to a first embodiment of the present invention.

FIG. 1 is a schematic diagram showing a configuration of an internal combustion engine having an exhaust gas purifying apparatus and a control system therefor according to a first embodiment of the present invention. The internal combustion engine 1 (hereinafter referred to as "engine") is a diesel engine in which fuel is directly injected into cylinders. Each cylinder is provided with a fuel injection valve 16. The fuel injection valve 16 is electrically connected to an electronic control unit (hereinafter referred to as "ECU") 20. The ECU 20 controls a valve opening period and a valve opening timing of the fuel injection valve 16.

The engine 1 has an intake pipe 2, an exhaust pipe 4, and a turbocharger 8. The turbocharger 8 includes a turbine 10 and a compressor 9. The turbine 10 is driven by the kinetic energy of exhaust gases. The compressor 9, which is rotationally driven by the turbine 10, compresses intake air of the engine 1.

The turbine 10 has a plurality of movable vanes (not shown), and is configured so that the rotational speed of the turbine 10 can be varied by changing an opening of the movable vanes (hereinafter referred to as "vane opening"). The vane opening of the turbine 10 is electro-magnetically controlled by the ECU 20.

The intake pipe 2 is provided with an intercooler 5 and an intake shutter (throttle valve) 3 on the downstream side of the compressor 9. The intercooler 5 cools pressurized air. The intake shutter 3 is provided for controlling an intake air amount and controlled to be opened/closed by the ECU 20.

An exhaust gas recirculation passage 6 is provided between the upstream side of the turbine 10 in the exhaust pipe 4 and the downstream side of the intake shutter 5 in the intake pipe 2. The exhaust gas recirculation passage 6 is provided with an exhaust gas recirculation control valve 7 (hereinafter referred to as "EGR valve") for controlling an exhaust gas recirculation amount. The EGR valve 7 is an electromagnetic valve having a solenoid. A valve opening of the EGR valve 7 is controlled by the ECU 20.

The exhaust pipe 4 is provided with a catalytic converter 11 and a DPF unit 12 in this order along the exhaust gas flow. The catalytic converter 11 and the DPF unit 12 are disposed downstream of the turbine 10.

The catalytic converter 11 has a NOx absorbent for absorbing NOx and a catalyst for promoting oxidization and reduction of the inflowing gases. The NOx absorbent absorbs NOx in the exhaust lean condition where the air-fuel ratio of the air-fuel mixture in the combustion chamber of the engine 1 is set in a lean region with respect to the stoichiometric ratio and the oxygen concentration in the exhaust gases is therefore relatively high (the proportion of NOx is large). The NOx absorbent discharges the absorbed NOx in the exhaust rich condition where the air-fuel ratio of the air-fuel mixture is set in the vicinity of the stoichiometric ratio or in a rich region with respect to the stoichiometric ratio and the oxygen concentration in the exhaust gases is therefore relatively low.

The catalytic converter 11 is configured so that the NOx discharged from the NOx absorbent is reduced by HC and CO in the exhaust rich condition, and emitted as nitrogen gas, and the HC and CO are oxidized into water vapor and carbon dioxide.

The DPF unit 12 consists of a main DPF 14, a sub DPF 15, and a container 13 containing the main DPF 14 and the sub DPF 15. The main DPF 14 and the sub DPF 15 trap soot which consists of particulates whose main component is carbon (C) in the exhaust gases, when the exhaust gases pass through small holes in the filter wall. Specifically, the inflowing soot is accumulated on the surface of the filter wall and in the small holes in the filter wall. For example, ceramics such as silicon carbide (SiC) or porous metal is used as materials for the filter wall. The sub DPF 15 is provided for detecting failure of the main DPF 14.

If the main DPF 14 traps soot up to the upper limit of the soot trapping capacity, i.e., to the accumulation limit, the exhaust pressure excessively rises. Therefore, it is necessary to perform the regeneration process for burning the trapped soot before the amount of trapped soot reaches the accumulation limit. In the regeneration process, the post-injection control is performed for raising the temperature of exhaust gases to the burning temperature of soot. In the post-injection control, the post-injection is performed during the explosion stroke or the exhaust stroke after the compression stroke, in addition to the normal injection during the compression stroke. The fuel injected in the post-injection burns in the combustion chamber of the engine 1 or in the catalytic converter 11, depending on the fuel injection timing.

The main DPF 14 is provided with a main DPF temperature sensor 21 for detecting a temperature (hereinafter referred to as "main DPF temperature") TDPFM. The sub DPF 15 is provided with a sub DPF temperature sensor 22 for detecting a temperature (hereinafter referred to as "sub DPF temperature") TDPFS. The detection signals of these temperature sensors 21 and 22 are supplied to the ECU 20.

Further, a crank angle position sensor for detecting a rotation angle of the crankshaft of the engine 1, an intake air flow rate sensor for detecting an intake air flow rate of the engine 1, a cooling water temperature sensor for detecting a cooling water temperature of the engine 1, an intake air temperature sensor for detecting an intake air temperature TA of the engine 1, an intake pressure sensor for detecting an intake pressure PB of the engine 1, an accelerator sensor for detecting a depression amount AP of the accelerator of the vehicle driven by the engine 1, an atmospheric pressure sensor for detecting an atmospheric pressure PA, an exhaust gas temperature sensor for detecting an exhaust gas temperature TE, and the like are provided (none of them is illustrated). The detection signals of these sensors are supplied to the ECU 20. The rotational speed of the engine 1 is calculated from the output of the crank angle position sensor.

The ECU 20 includes an input circuit, a central processing unit (hereinafter referred to as "CPU"), a memory circuit, and an output circuit. The input circuit has various functions, including shaping the waveform of input signals from various sensors, correcting a voltage level to a predetermined level, and converting analog signal values into digital signal values. The memory circuit stores operation programs to be executed by the CPU, results of the calculations performed by the CPU, and the like. The output circuit supplies driving signals to the fuel injection valve 16, and the EGR valve 7.

Figure 2:
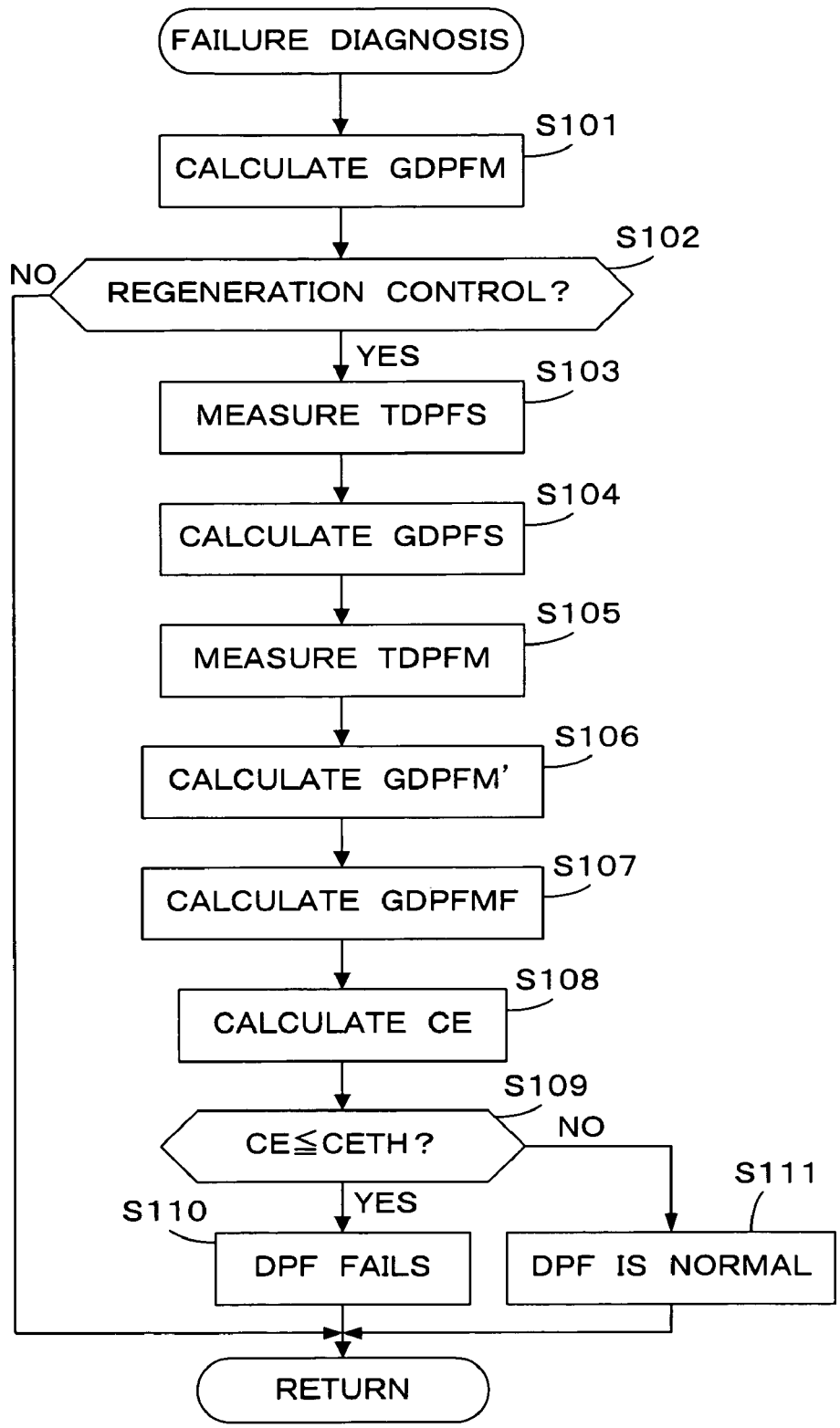
FIG. 2 is a flowchart showing a process of the failure diagnosis.

FIG. 2 is a flowchart showing a method of diagnosing a failure of the main DPF 14 in the DPF unit 12. Specifically, deterioration of the filtering capability due to a crack or a hole in the filter wall is diagnosed. This failure diagnosis process is executed by the CPU in the ECU 20.

In step S101, an amount (hereinafter referred to as "main DPF accumulation amount") GDPFM of the particulates trapped by the main DPF14 is calculated. The calculation of the main DPF accumulation amount GDPFM is performed by a known method, such as calculating the accumulation amount at constant time intervals based on the algorithm and map which are previously stored, according to the engine operating condition (e.g., the engine rotational speed and the engine load) and a pressure difference DP between a pressure on the upstream side of the DPF unit 12 and a pressure on the downstream side of the DPF unit 12.

In step S102, it is determined whether or not the regeneration control for burning the accumulated soot is performed. If the main DPF accumulation amount GDPFM calculated in step S101 does not exceed a predetermined regeneration control threshold value GPTH, the answer to step S102 becomes negative (NO), and the failure diagnosis is not performed. If the main DPF amount GDPFM exceeds the predetermined regeneration control threshold value GPTH, the regeneration control is performed and steps S103-S111 are executed. The regeneration control is performed by the post-injection, to raise the exhaust gas temperature, as described above.

In step S103, the sub DPF temperature TDPFS is measured with the sub DPF temperature sensor 22. In step S104, an amount (hereinafter referred to as "sub DPF accumulation amount") GDPFS of particulates trapped in the sub DPF 15 is calculated based on the sub DPF temperature TDPFS. Specifically, the sub DPF accumulation amount GDPFS is calculated as described below.

Figure 3:
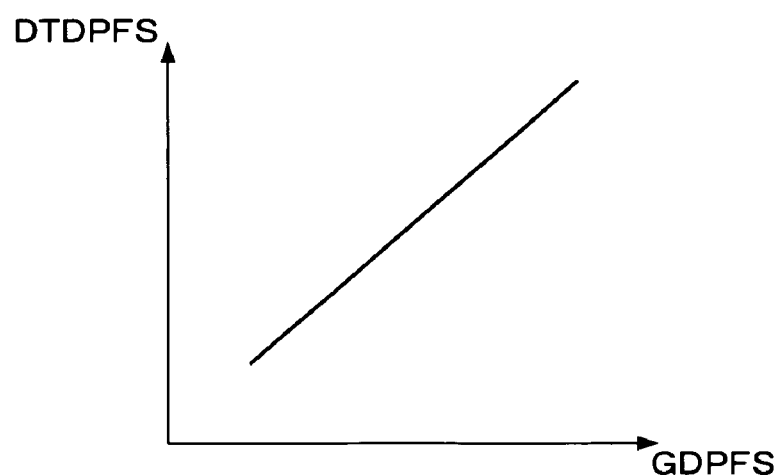
FIG. 3 shows a relationship between an amount (GDPFS) of the accumulated particulates and an amount (DTDPFS) of rise in the temperature.

A map indicating the relationship between engine operating parameters (for example, the engine rotational speed and the engine load) indicative-of an engine operating condition, and the temperature of high temperature exhaust gases supplied to the DPF unit 12 by execution of the DPF regeneration control, is previously stored in the memory circuit, and a reference exhaust gas temperature TEXREF is calculated by retrieving the map according to the detected engine operating parameters (for example, the engine rotational speed and the engine load). Next, a difference between the maximum value TDPFSMAX of the sub DPF temperature TDPFS during execution of the regeneration control execution and the reference exhaust gas temperature TEXREF is calculated as a temperature rise amount DTDPFS. Further, a GDPFS table shown in FIG. 3 is retrieved according to the temperature rise amount DTDPFS, to calculate the sub DPF accumulation amount GDPFS. The GDPFS table is previously stored in the memory circuit in the ECU 20 by measuring the relationship between the temperature rise amount DTDPFS and the sub DPF accumulation amount GDPFS.

The reason why the temperature rise amount DTDPFS is calculated as a difference between the maximum value TDPFSMAX of the sub DPF temperature and the reference exhaust gas temperature TEXREF is as follows:

For the sake of the following explanation, an exhaust gas temperature before starting of the regeneration control of the DPF is expressed by "TEX0", and an exhaust gas temperature during execution of the regeneration control is expressed by "TEX1" (>TEX0). By supplying the exhaust gases of an exhaust gas temperature TEX1 to the DPF unit 12, the particulates accumulated in the sub DPF22 burn, and the sub DPF temperature TDPFS rises to the maximum value TDPFSMAX. Therefore, the relationship of TDPFSMAX>TEX1>TEX0 is satisfied.

On the other hand, the regeneration control is actually performed by a first control mode in which the above-described post-injection is executed or a second control mode in which closing of the intake shutter 3 and the post-injection are executed. Selection of the control mode out of the first and second control modes is determined according to the engine operating condition (for example, the engine rotational speed and the engine load). Therefore, by previously calculating the reference exhaust gas temperature TEXREF (corresponding to the above-described exhaust gas temperature TEX1) according to the engine operating parameters, and calculating the temperature rise amount DTDPFS as a difference between the reference exhaust gas temperature TEXREF and the maximum value TDPFSMAX, an accurate temperature rise amount which does not include a rise amount of the exhaust gas temperature TEX can be obtained.

In step S105, the main DPF temperature TDPFM is measured with the main DPF temperature sensor 21. In step S106, the main DPF accumulation amount GDPFM' is calculated based on the main DPF temperature TDPFM measured in step S105, with the same method as in step S104. Next in step S107, the greater one of the main DPF accumulation amount GDPFM calculated in step S101 and the main DPF accumulation amount GDPFM' calculated in step S106 is selected as a final main DPF accumulation amount GDPFMF. The reason for selecting the greater one is to select the safe side in consideration that the calculated accumulation amount includes an error (to avoid deterioration of the engine performance due to incorrect estimation that the actual accumulation amount becomes greater than the calculated accumulation amount).

In step S108, the final main DPF accumulation amount GDPFMF and the sub DPF accumulation amount GDPFS are applied to the following equation (1), to calculate a trapping rate CE of particulates by the main DPF 14.

$$CE=GDPFMF/(GDPFMF+GDPFS) \quad (1)$$

In step S109, it is determined whether or not the trapping rate CE is equal to or less than a determination threshold value CETH (for example, 0.8). As a result, if the trapping rate CE is equal to or less than the determination threshold value CETH, it is determined that the main DPF 14 fails, i.e., the filtering capability of the main DPF 14 is deteriorated due to a crack or a hole in the filtering wall (step S110). If the trapping rate CE is greater than the determination threshold value CETH, the main DPF 14 is determined to be normal (step S111).

As described above, in this embodiment, the sub DPF 15 is provided downstream of the main DPF 14, and the failure diagnosis of the main DPF 14 is performed based on the amount of particulates trapped in the sub DPF 15. If a crack or a hole is present in the main DPF 14, the particulates in the exhaust gases pass through the main DPF 14, and are trapped by the sub DPF 15. Therefore, it can be determined whether the main DPF 14 fails, by detecting an amount of particulates trapped in the sub DPF 15, i.e., the sub DPF accumulation amount GDPFS. Further, since an amount of the particulates that have passed through the main DPF 14 can be detected from the sub DPF accumulation amount GDPFS, the failure state of the main DPF 14 can be accurately detected with a comparatively simple configuration. That is, since the sub DPF accumulation amount GDPFS corresponds to an amount (a leak amount) of particulates that have passed through the main DPF 14, it is possible to surely detect the failure before the leak amount exceeds the predetermined limit value.

The sub DPF accumulation amount GDPFS is calculated based on the sub DPF temperature TDPFS detected during the regeneration process of the main DPF 14. When performing the regeneration control of the DPF, the particulates accumulated in the main DPF 14 and the sub DPF 15 burns, and the temperature TDPFS of the sub DPF 15 rises. The temperature rise amount DTDPFS is considered to be substantially proportional to the sub DPF accumulation amount GDPFS. Therefore, an accurate sub DPF accumulation amount GDPFS, for example, except the influence of ashes of the particulates etc. can be calculated from the temperature rise amount DTDPFS.

Further, the amount of particulates trapped by the main DPF 14, i.e., the final accumulation amount GDPFMF, is also calculated (step S107), and the particulate trapping rate CE of the main DPF 14 is calculated based on the final accumulation amount GDPFMF and the sub DPF accumulation amount GDPFS (step S108). Since the sum of the final main DPF accumulation amount GDPFMF and the sub DPF accumulation amount GDPFS is considered to be the total amount of particulates emitted from the engine 1, the trapping rate CE can be calculated from the total amount of particulates and the final main DPF accumulation amount GDPFMF. By calculating the trapping rate CE, the degree of the failure (whether the failure is serious or slight) can be determined.

In this embodiment, the main DPF 14 corresponds to the first filtering means, and the sub DPF 15 corresponds to the second filtering means. The temperature sensors 21 and 22, and the ECU 20 constitute the trapping state detecting means. The ECU 20 constitutes the filter diagnosing means. Specifically, steps S103-S107 of FIG. 2 correspond to the trapping state detecting means, and steps S108-S111 correspond to the filter diagnosing means.

Modification

In the embodiment described above, the reference exhaust gas temperature TEXREF is calculated according to the engine operating parameters (for example, the engine rotational speed and the engine load), and the temperature rise amount DTDPFS is calculated as a difference between the maximum value TDPFSMAX of the sub DPF temperature TDPFS during execution of the regeneration control and the reference exhaust gas temperature TEXREF. Alternatively, the exhaust gas temperature TEX may be detected immediately before starting the regeneration control, and the temperature rise amount DTDPFS may be calculated as a difference between the maximum value TDPFSMAX and the detected exhaust gas temperature TEX. However, since the exhaust gas temperature TEX changes depending on the engine operating condition, the temperature rise amount DTDPFS may contain a rise amount of the exhaust gas temperature TEX, if the exhaust gas temperature TEX is used as it is. As described above, by using the reference exhaust gas temperature TEXREF, the temperature rise amount of the sub DPF 15 due to combustion of the trapped particulates can be accurately calculated.

Further, the regeneration control of the DPF may be performed by, in addition to the first and second modes, a third control mode in which the boost pressure by the turbocharger 8 is reduced, and/or a fourth control mode in which a heater disposed upstream of the main DPF 14 is turned on. Further, the regeneration control may be performed by combining two or more of the first to fourth control modes, or selecting one control mode according to the engine operating condition.

Further, in the embodiment described above, the final main DPF accumulation amount GDPFMF is calculated by selecting the larger one of the main DPF accumulation amount GDPFM calculated in step S101 and the main DPF accumulation amount GDPFM' calculated in step S106. Alternatively, the final main DPF accumulation amount GDPFMF may be always set to the main DPF accumulation amount GDPFM' calculated based on the main DPF temperature TDPFM. Alternatively, equations or tables for correcting the main DPF accumulation amount may be previously prepared, and the final main DPF accumulation amount GDPFMF may be calculated by using the equations or tables for correction according to the main DPF accumulation amounts GDPFM and GDPFM' calculated in steps S101 and S106. Further, the estimation (calculation) algorithm of the main DPF accumulation amount used in step S101 may be learned based on the main DPF accumulation amount GDPFM' calculated in step S106.

Further, in the embodiment described above, the failure diagnosis is performed during the regeneration control for the main DPF 14 with the post-injection etc. Alternatively, the failure diagnosis may be performed during the continuous regeneration. For example, when the high load operation of the engine 1 is performed, the exhaust gas temperature rises so that the continuous regeneration in which the particulates trapped in the DPF naturally burn may occur. Accordingly, in such engine operating condition, the failure diagnosis can be performed without performing the regeneration control.

Figure 4:
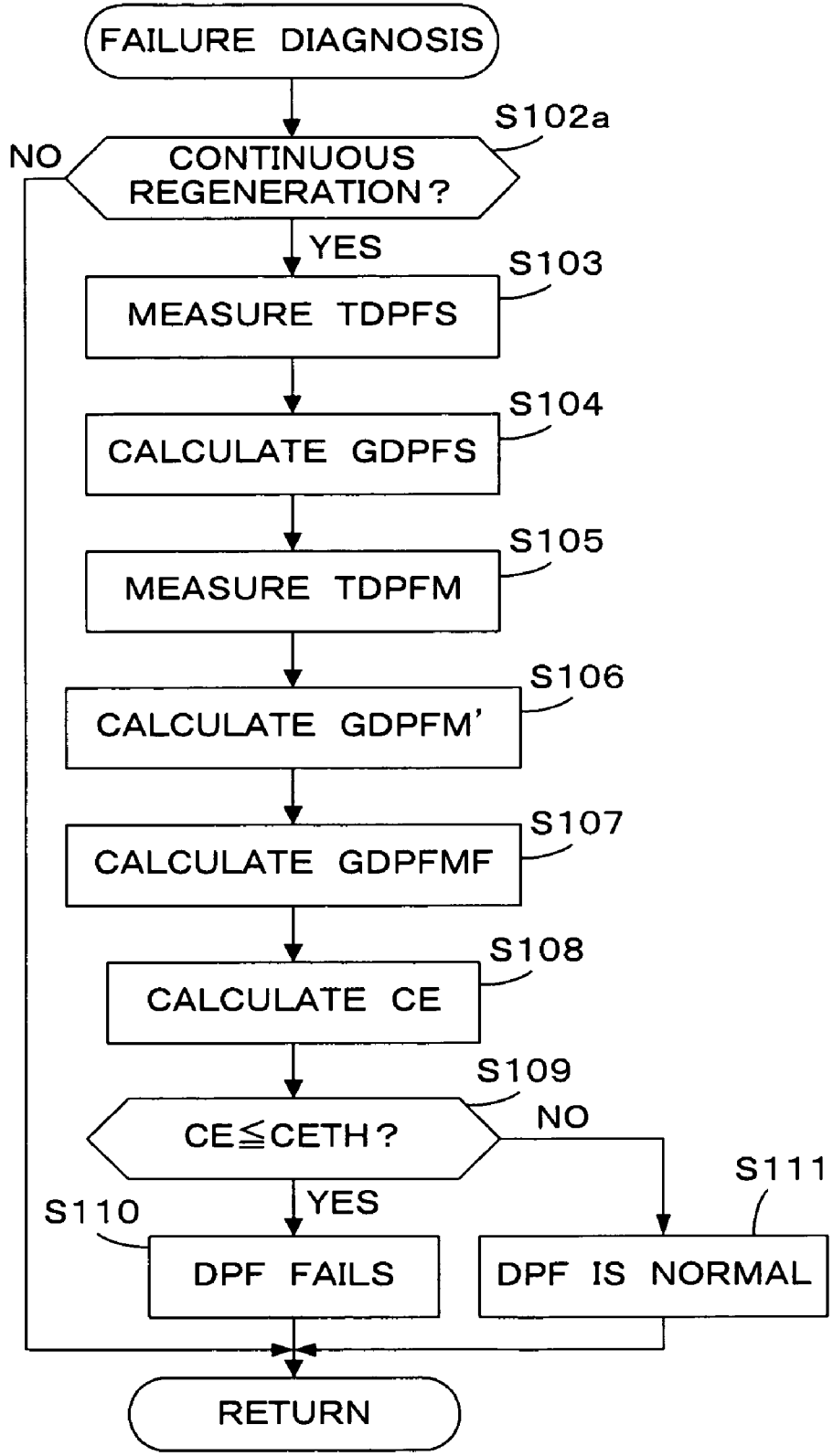
FIG. 4 is a flowchart showing a modification of the process shown in FIG. 2.

FIG. 4 is a flowchart showing a method of the failure diagnosis in this modification. The flowchart shown in FIG. 4 is obtained by canceling step S101 of FIG. 2 and changing step S102 to step S102a. In step S102a, it is determined whether or not the continuous regeneration is occurring, and the steps following step S103 are executed if the continuous regeneration occurs. For example, it is determined that the continuous regeneration occurs when both of the engine rotational speed and the engine load exceeds corresponding predetermined threshold values.

In this modification, the main DPF accumulation amount GDPFM' calculated during the continuous regeneration in step S106 is adopted as the final main DPF accumulation amount GDPFMF.

Further, in the embodiment described above, the failure diagnosis is performed by calculating the trapping rate CE, and comparing the trapping rate CE with the determination threshold value CETH. Alternatively, the failure diagnosis may be performed by comparing the sub DPF accumulation amount GDPFS or the temperature rise amount DTDPFS with a corresponding determination threshold value.

Second Embodiment

Figure 5:
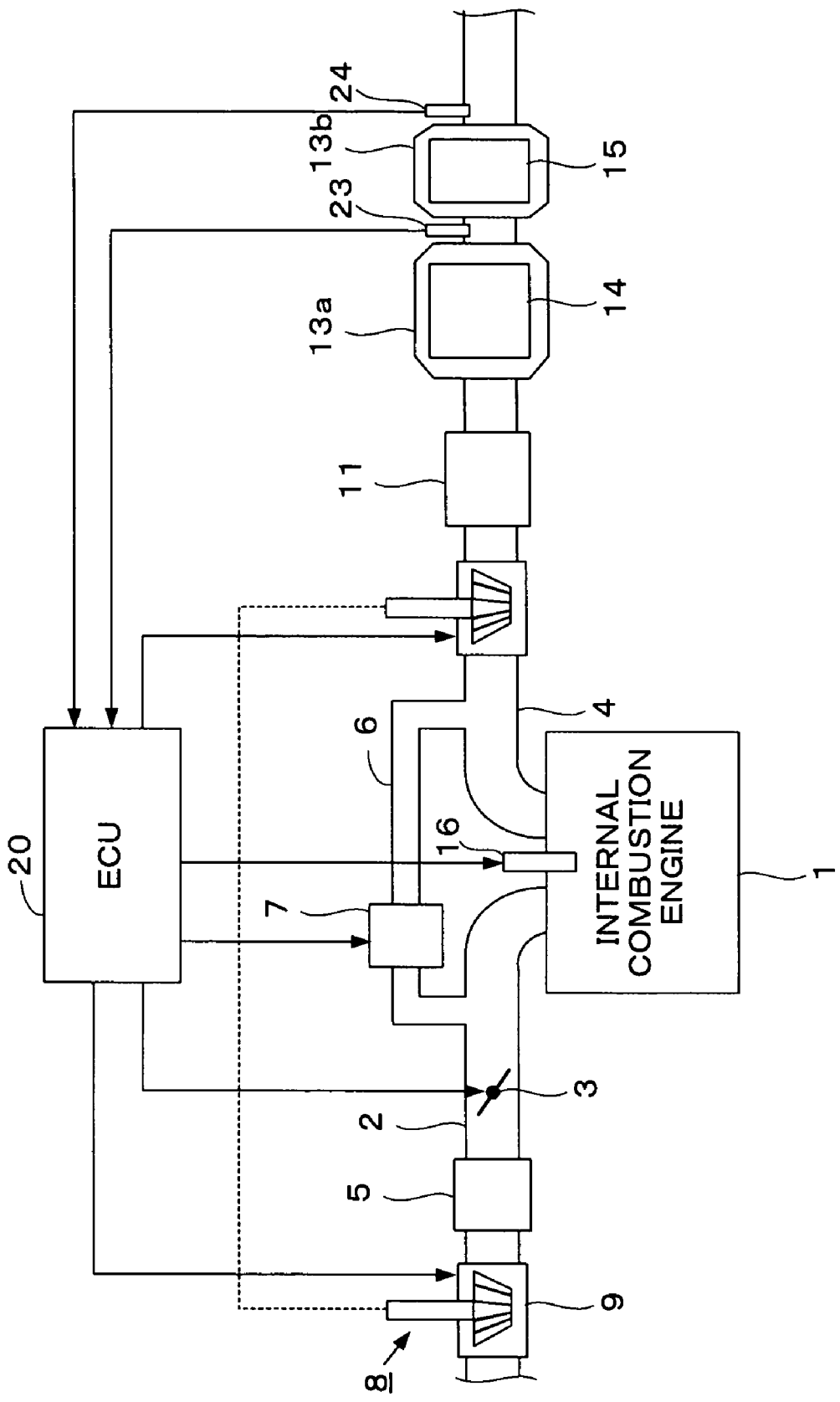
FIG. 5 is a schematic diagram showing a configuration of an internal combustion engine having an exhaust gas purifying apparatus and a control system therefor according to a second embodiment of the present invention.

FIG. 5 is a schematic diagram showing a configuration of an internal combustion engine having an exhaust gas purifying apparatus, and a control system therefore, according to a second embodiment of the present invention. In this embodiment, the main DPF 14 and the sub DPF 15 are contained respectively in containers 13a and 13b, and pressure sensors 23 and 24 are provided respectively on the upstream side and the downstream side of the sub DPF 15. The detection signals of pressure sensors 23 and 24 are supplied to the ECU 20. Except this point, the configuration is the same as that of the first embodiment shown in FIG. 1.

Figure 6:
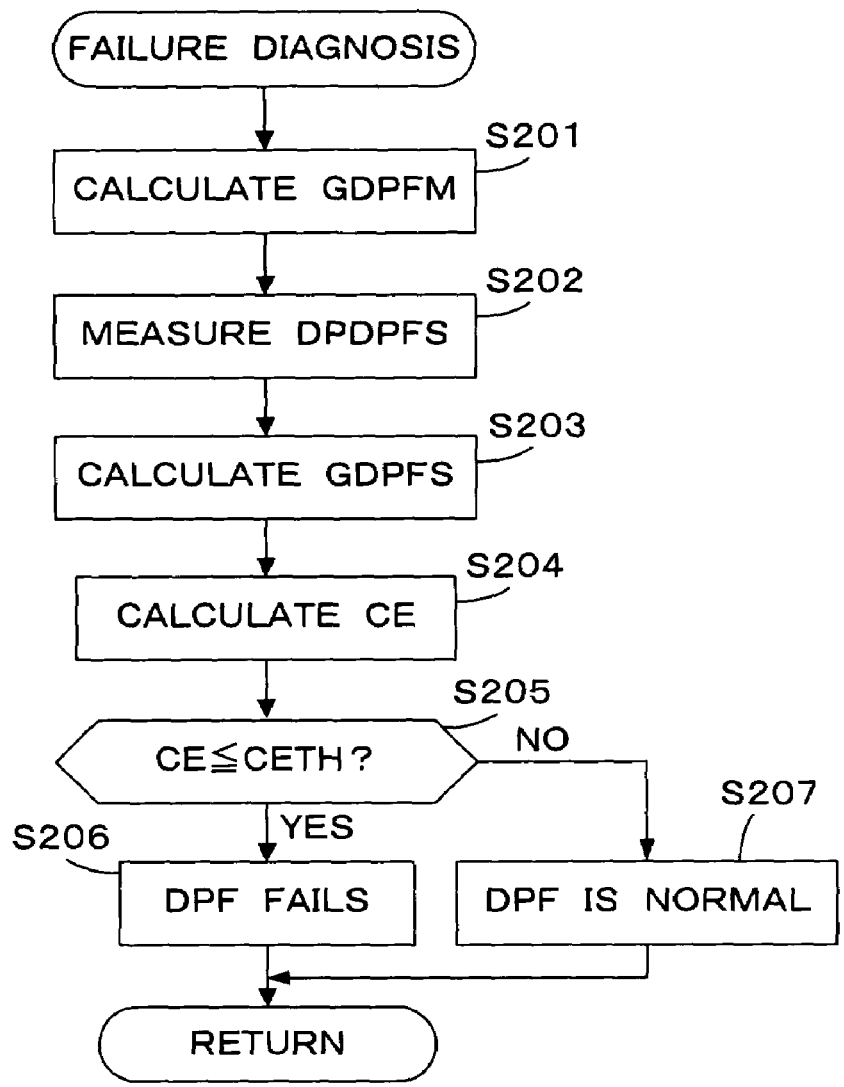
FIG. 6 is a flowchart showing a process of the failure diagnosis in the second embodiment.

FIG. 6 is a flowchart showing a method of the failure diagnosis in this embodiment. In step S201, the main DPF accumulation amount GDPFM is calculated similarly in step S101 of FIG. 2. In step S202, a pressure difference DPDPFS between the upstream pressure and the downstream pressure of the sub DPF 15 is measured with the two pressure sensors 23 and 24. Next, the sub DPF accumulation amount GDPFS is calculated according to the pressure difference DPDPFS (step S203).

In step S204, the main DPF accumulation amount GDPFM and the sub DPF accumulation amount GDPFS are applied to the following equation (2), to calculate the trapping rate CE of particulates by the main DPF 14. The equation (2) is obtained by changing "GDPFMF" of the equation (1) to "GDPFM".

$$CE = GDPFM/(GDPFM + GDPFS) \quad (2)$$

In steps S205-S207, the same process as steps S109-S111 of FIG. 2 is performed.

In this embodiment, the sub DPF accumulation amount GDPFS is calculated according to the pressure difference DPDPFS. Accordingly, the failure diagnosis can be performed irrespective of whether the regeneration control is being performed or not.

In this embodiment, the pressure sensors 23 and 24, and the ECU 20 constitute the trapping state detecting means, and the ECU 20 constitutes the filter diagnosing means. Specifically, steps S201-S203 of FIG. 6 correspond to the trapping state detecting means, and steps S204-S207 correspond to the filter diagnosing means.

Modification

Also in this embodiment wherein the main DPF 14 and the sub DPF 15 are separately configured, temperature sensors may be provided respectively in the man DPF 14 and the sub DPF 15, and the main DPF accumulation amount GDPFM and the sub DPF accumulation amount GDPFS may be calculated according to the temperature rise amount, like the first embodiment.

Third Embodiment

Figure 7:
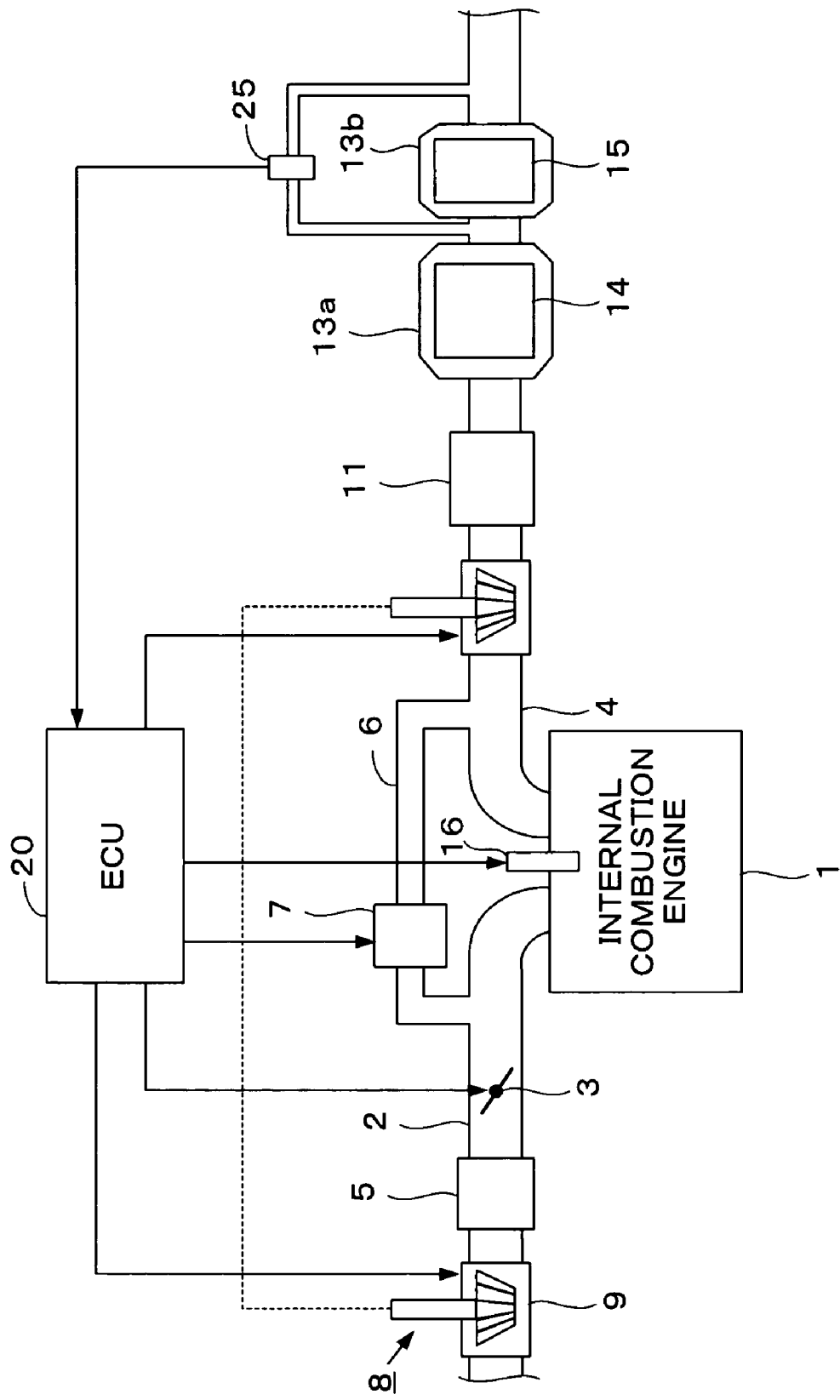
FIG. 7 is a schematic diagram showing a configuration of an internal combustion engine having an exhaust gas purifying apparatus and a control system therefor according to a third embodiment of the present invention.

FIG. 7 is a schematic diagram showing a configuration of an internal combustion engine having an exhaust gas purifying apparatus and a control system therefor according to a third embodiment of the present invention. In this embodiment, the main DPF 14 and the sub DPF 15 are contained respectively in containers 13a and 13b like the second embodiment. In stead of the pressure sensors 23 and 24 in the second embodiment, a pressure difference sensor 25 for detecting the pressure difference DPDPFS of the upstream pressure and the downstream pressure of the sub DPF 15. The detection signal of the pressure difference sensor 25 is supplied to the ECU 20. Except this point, the configuration is the same as that of the first embodiment shown in FIG. 1.

In the first embodiment described above, the failure diagnosis is performed based on the particulate accumulation amount (the main DPF accumulation amount GDPFM and the sub DPF accumulation amount GDPFS), without taking the accumulation amount of ashes (which are generated by oxidization of metal ingredients (Mg, Ca, etc.) of the metallic cleaning agent contained mainly in the engine oil, as well as oxidization of a sulfur ingredient contained in fuel) accumulated in the main DPF 14 and the sub DPF 15 into consideration. Further, in the second embodiment, the sub DPF accumulation amount GDPFS actually includes the ash accumulation amount, since the sub DPF accumulation amount GDPFS is calculated based on the pressure difference DPDPFS. However, the sub DPF accumulation amount GDPFS is regarded as the particulate accumulation amount like the first embodiment, since the ash accumulation amount is very little as compared with the particulate accumulation amount.

In this embodiment, a sum of the particulate accumulation amount GDPFM and the ash accumulation amount GASHM of the main DPF 14 is calculated as a main DPF total accumulation amount GDPFTM, and a sum of the particulate accumulation amount and the ash accumulation amount of the sub DPF 15 is calculated as a sub DPF total accumulation amount GDPFTS. The failure diagnosis is performed taking the ash accumulation amount into consideration, by using the main DPF total accumulation amount GDPFTM and the sub DPF total accumulation amount GDPFTS. The main DPF total accumulation amount GDPFTM corresponds to a sum of the amount of particulates generated in the engine 1 and the amount of generated ashes.

Figure 8:
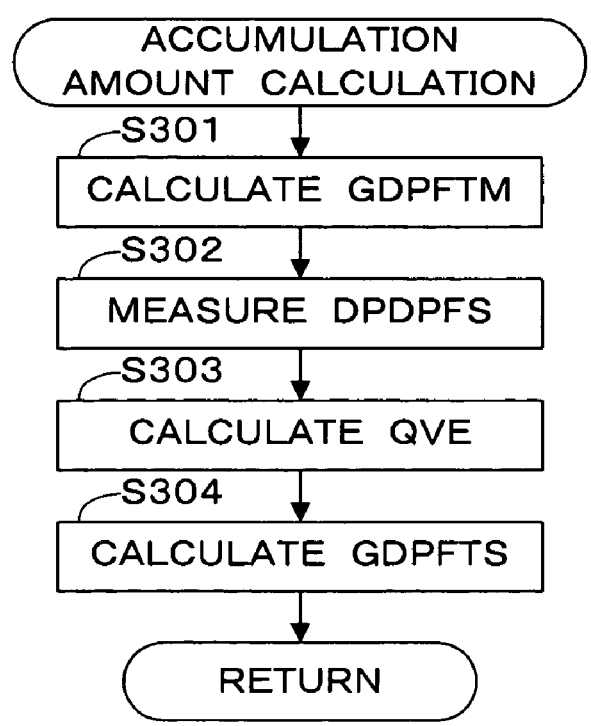
FIG. 8 is a flowchart showing a process for calculating an amount of the particulates and ashes accumulated in the DPF.

FIG. 8 is a flowchart showing a process for calculating (estimating) particulate accumulation amounts and ash accumulation amounts of the main DPF 14 and the sub DPF 15. The particulate accumulation amounts and ash accumulation amounts are referred to in the failure diagnosis in this embodiment. This process is executed at predetermined time intervals by the CPU in the ECU 20.

In step S301 of FIG. 8, the particulate accumulation amount GDPFM and the ash accumulation amount GASHM is calculated according to the operating condition of the engine 1. Further, the particulate accumulation amount GDPFM and the ash accumulation amount GASHM are added to calculate the main DPF total accumulation amount GDPFTM.

The particulate accumulation amount GDPFM is specifically calculated as follows: Firstly, a basic accumulation amount GDPFMB is calculated according to the engine rotational speed NE and the fuel injection amount QINJ. Secondly, an instantaneous accumulation amount GDPFMT is calculated by correcting the basic accumulation amount GDPFMB according to the cooling water temperature TW, the intake air temperature TA, the atmospheric pressure PA, the intake air flow rate GA, and the exhaust gas temperature TE. Thirdly, the particulate accumulation amount GDPFM is calculated by accumulating the instantaneous accumulation amount GDPFMT. The fuel injection amount QINJ is a parameter indicative of the engine load, which is calculated according to the accelerator depressing amount AP.

The ash accumulation amount GASHM is calculated as follows, paying attention to the fact that the ash accumulation amount GASHM is substantially proportional to a consumption amount of the engine oil in the engine 1. That is, a basic ash accumulation amount GASHMB is calculated according to the engine rotational speed NE and the fuel injection amount QINJ, the instantaneous ash accumulation amount GASHMT is calculated by correcting the basic ash accumulation amount GASHMB according to the cooling water temperature TW, and the ash accumulation amount GASHM is calculated by accumulating the instantaneous ash accumulation amount GASHMT.

When performing the regeneration process and burning all of the trapped particulates, the particulate accumulation amount GDPFM is rest to "0". When a part of the trapped particulates is burned in the regeneration process, the particulate accumulation amount GDPFM is reduced by an amount corresponding to a degree of the regeneration (an amount of the burnt particulates).

In step S302, the pressure difference DPDPFS is measured by the pressure difference sensor 25. In step S303, the exhaust volume flow rate QVE is calculated by the following equation (3).

$$QVE = GE \times R \times TEA/PE \quad (3)$$

"GE" in the equation (3) is an exhaust mass flow rate which is calculated by converting the fuel injection amount QINJ into a fuel injection amount QINJS per unit time period according to the engine rotational speed NE, and adding the intake air flow rate GA and the fuel injection amount QINJS. "R" in the equation (3) is a gas constant. "TEA" in the equation (3) is an absolute temperature corresponding to the detected exhaust gas temperature TE. "PE" in the equation (3) is an exhaust pressure on the upstream side of the sub DPF 15. In this embodiment, the exhaust pressure PE is calculated by adding the pressure difference DPDPFS detected by the pressure difference sensor 25 to the atmospheric pressure PA.

In step S304, a GDPFTS map (not shown) is retrieved according to the pressure difference DPDPFS and the exhaust volume flow rate QVE, to calculate a total accumulation amount of the sub DPF 15, i.e., the sub DPF total accumulations amount GDPFTS. The sub DPF total accumulation amount GDPFTS corresponds to a sum of the amounts of particulates and ashes accumulated in the sub DPF 15. The GDPFTS map is set so that the subDPF all accumulation amount GDPFTS may increase as the exhaust volume flow rate QVE decreases, and/or the pressure difference DPDPFS increases.

By repeating the process of FIG. 8 at predetermined time intervals, the main DPF total accumulation amount GDPFTM and the sub DPF total accumulation amount GDPFTS are calculated.

Figure 9:
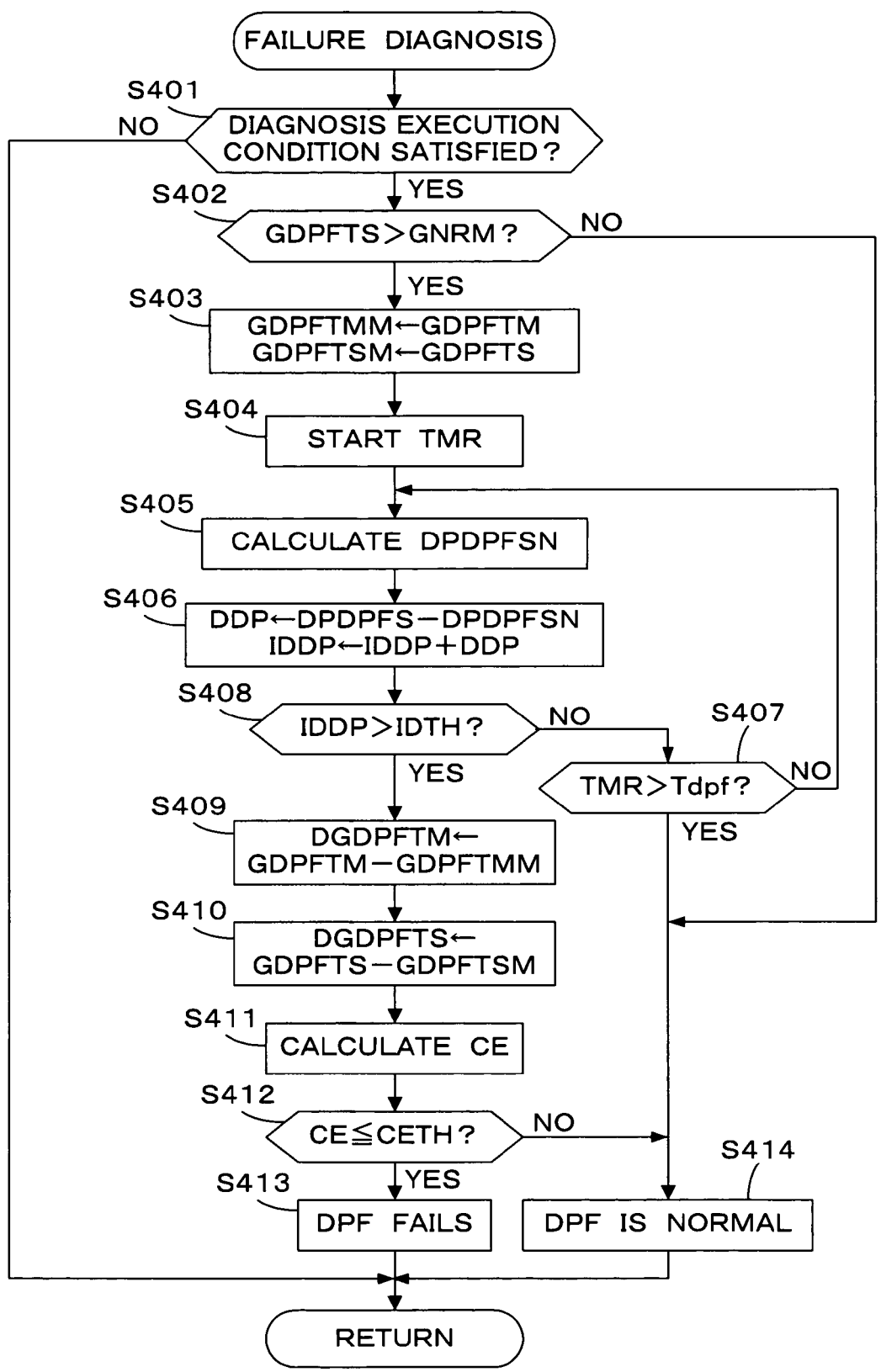
FIG. 9 is a flowchart showing a process of the failure diagnosis.

FIG. 9 is a flowchart showing a method of performing the failure diagnosis of the main DPF 14 using the main DPF total accumulation amount GDPFTM and the sub DPF total accumulation amount GDPFTS calculated by the process of FIG. 8. This process is executed by the CPU in the ECU 20.

In step S401, it is determined whether or not an execution condition of the failure diagnosis is satisfied. Specifically, the diagnosis execution condition is satisfied when the detected engine rotational speed NE, intake air temperature TA, engine cooling water temperature TW, intake pressure PB, atmospheric pressure PA, and the calculated fuel injection amount QINJ, etc. are all within predetermined ranges. If the answer to step S401 is negative (NO), this process immediately ends.

If the diagnosis execution condition is satisfied, it is determined whether or not the sub DPF total accumulation amount GDPFTS is greater than a predetermined normal value GNRM (which is, for example, set to a small value near "0") (step S402). If the answer to step S402 is negative (NO), which indicates that the sub DPF total accumulation amount GDPFTS is almost "0", the main DPF 14 is determined to be normal (step S414). On the other hand, if GDPFTS is greater than GNRM, it is determined that the main DPF 14 may possibly fail. Then, the process proceeds to step S403.

In step S403, the main DPF total accumulation amount GDPFTM calculated immediately after the answer to step S402 becomes affirmative (YES) is stored as a main DPF total accumulation amount stored value GDPFTMM, and the sub DPF total accumulation amount GDPFTS is stored as a sub DPF total accumulation amount stored value GDPFTSM. In step S404, an upcount timer TMR is started.

Figure 10:
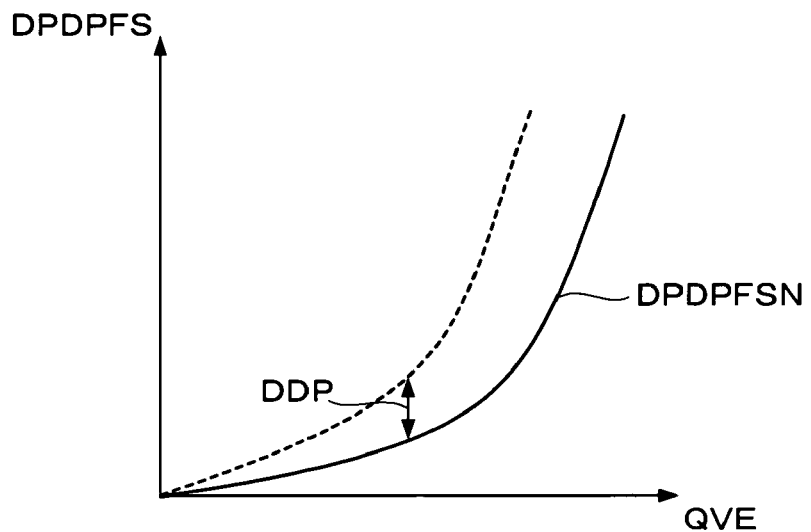
FIG. 10 shows a table which is referred to in the process of FIG. 9.

In step S405, a DPDPFSN table shown in FIG. 10 is retrieved according to the exhaust volume flow rate QVE, to calculate a normal pressure difference DPDPFSN. The normal pressure difference DPDPFSN corresponds to a pressure difference DPDPFS in the state where the sub DPF total accumulation amount GDPFTS is equal to "0".

In step S406, the detected pressure difference DPDPFS and the normal pressure difference DPDPFSN is applied to the following equation (4), to calculate a difference value DDP. Further, an accumulation value IDDP of the difference value DDP is calculated by the following equation (5).

$$DDP = DPDPFS - DPFPFSN \quad (4)$$

$$IDDP = IDDP + DDP \quad (5)$$

where IDDP on the right side of the equation (5) is a preceding calculated value.

If the main DPF 14 fails and the particulates leaks, the sub DPF total accumulation amount GDPFTS becomes greater than "0", and the pressure difference DPDPFS becomes higher than the normal pressure difference DPDPFSN, as shown by the dashed line in FIG. 10. Therefore, in this embodiment, the failure determination is performed based on the difference value DDP between the detected pressure difference DPDPFS and the normal pressure difference DPDPFSN.

In step S408, it is determined whether or not the accumulated value IDDP is greater than a determination reference value IDTH. If the answer to step S408 is negative (NO), it is further determined whether or not a value of the timer TMR exceeds a predetermined diagnosis time period Tdpf (for example, 20 minutes) (step S407). If the answer to step S407 is negative (NO), the process returns to step S405 described above. Thereafter, if the value of the timer TMR exceeds the predetermined diagnosis time period Tdpf before the answer to step S408 becomes affirmative (YES), the process proceeds to step S414 described above, and the main DPF 14 is determined to be normal.

Figure 11:
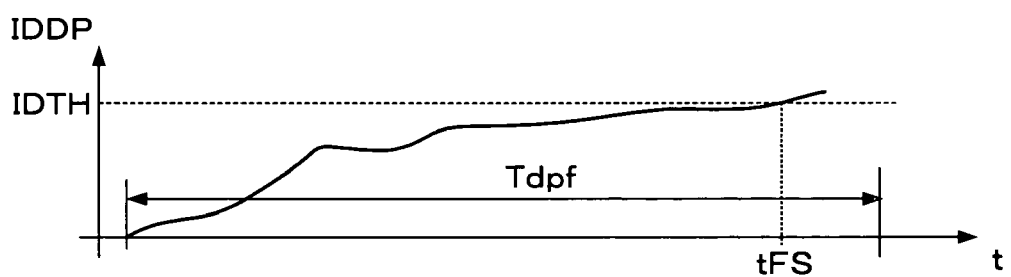
FIG. 11 shows changes in an accumulated value (IDDP) of a difference value between the detected pressure difference (DPDPFS) and the normal value (DPDPFSN)

If the accumulated value IDDP exceeds the determination reference value IDTH in step S408 (refer to FIG. 11, time tFS), before the value of the timer TMR reaches the predetermined diagnosis time period Tdpf, then the process proceeds to step S409, in which a change amount DGDPFTM of the main DPF accumulation amount is calculated by subtracting the main DPF total accumulation amount stored value GDPFTMM from the present main DPF total accumulation amount GDPFTM. In step S410, a change amount DGDPFTS of the sub DPF accumulation amount is calculated by subtracting the sub DPF total accumulation amount stored value GDPFTSM from the present sub DPF total accumulation amount GDPFTS.

In step S411, the change amount DGDPFTM of the main DPF accumulation amount and the change amount DGDPFTS of the sub DPF accumulation amount are applied to the following equation (6), to calculate the trapping rate CE of the main DPF 14.

$$CE = (DGDPFTM - DGDPFTS)/DGDPFTM \quad (6)$$

The main DPF total accumulation amount GDPFTM is actually a sum (hereinafter referred to as "total generation amount") of the particulate generation amount and the ash generation amount, as described above. Therefore, the change amount DGDPFTM of the main DPF accumulation amount corresponds to the total generation amount in the period (hereinafter referred to as "determination period TDET") from the time the particulates starts to leak from the main DPF 14 to the time the accumulated value IDDP exceeds the determination threshold value IDTH. On the other hand, the change amount DGDPFTS of the sub DPF accumulation amount corresponds to a sum of amounts of the particulates and ashes accumulated in the sub DPF 15 during the determination period TDET. Therefore, the numerator of the equation (6) corresponds to a sum of amounts of the particulates and ashes accumulated in the main DPF 14 during the determination period TDET. Therefore, the trapping rate CE of the main DPF 14 can be calculated by the equation (6).

In step S412, it is determined whether or not the trapping rate CE is equal to or less than the determination threshold value CETH. If the trapping rate CE is equal to or less than the determination threshold value CETH, it is determined that the main DPF 14 fails, i.e., the filtering capability of the main DPF 14 is deteriorated due a crack or a hole of the filter wall (step S413). If the trapping rate CE is greater than the determination threshold value CETH, the main DPF14 is determined to be normal (step S414).

As described above, in this embodiment, the sub DPF total accumulation amount GDPFTS is calculated based on the pressure difference DPDPFS between the upstream pressure and the downstream pressure of the sub DPF 15, and the failure diagnosis is performed based on the sub DPF total accumulation amount GDPFTS. Accordingly, the failure diagnosis can be performed even when the regeneration process is not performed.

Further, the trapping rate CE is calculated by the equation (6) using the change amounts DGDPFTM and DGDPGTS of accumulation amounts. Therefore, the trapping rate CE can be calculated more accurately compared with the trapping rate calculated using the total accumulation amounts GDPFTM and GDPFTS. This point will be explained with reference to FIGS. 12A and 12B.

Figure 12A:
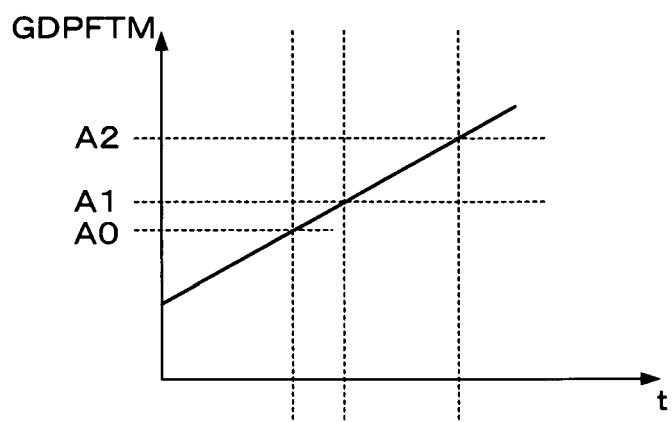
FIGS. 12A and 12B illustrate an advantage of the trapping rate calculation method shown in the third embodiment.
Figure 12B:
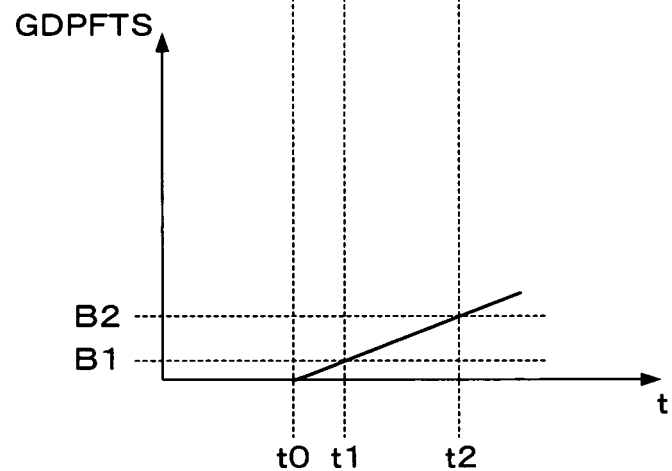

FIG. 12A shows changes in the main DPF total accumulation amount GDPFTM (i.e., the total generation amount), and FIG. 12B shows changes in the sub DPF total accumulation amount GDPFTS. In the shown example, the leak of the main DPF 14 begins from time t0, and thereafter the sub DPF total accumulation amount GDPFTS increases gradually.

If time t1 corresponds to the time the answer to step S402 of FIG. 9 becomes affirmative (YES), and time t2 corresponds to the time the answer to step S408 becomes affirmative (YES), a trapping rate CE1 using the total accumulation amounts is given by the following equation (7), and a trapping rate CE2 using the change amounts of the total accumulation amounts is given by the following equation (8).

$$CE1 = (A2 - B2)/A2 \quad (7)$$

$$CE2 = \{(A2 - A1) - (B2 - B1)\}/(A2 - A1) \quad (8)$$

The trapping rate CE1 is subjected to the influence of a total accumulation amount A0 indicative of an amount of particulates accumulated before the leak of the main DPF 14 begins, while the trapping rate CE2 is not subjected to the influence of the total accumulation amount A0. Therefore, the trapping rate CE2 is more accurate than the trapping rate CE1.

Further in this embodiment, the accumulated value of the difference value between the normal value and the measured value is compared with the determination reference value, and the failure determination of the DPF is performed when the accumulated value exceeds the determination reference value. The measured pressure difference changes due to the influence of the exhaust gas pulsation. However, an accumulated value of deviations of the measured pressure difference from the normal value becomes substantially equal to "0". Therefore, an erroneous determination that the detected changes in the pressure difference due to the exhaust gas pulsation are caused by the DPF failure can be prevented.

In this embodiment, the pressure difference sensor 25 and the ECU 20 constitute the trapping state detecting means, and the ECU 20 constitutes the filter diagnosing means. Specifically, the process of FIG. 8 corresponds to the trapping state detecting means, and steps S402-S414 of FIG. 9 corresponds to the filter diagnosing means.

Modification

In step S301 of FIG. 8 described above, the main DPF total accumulation amount GDPFTM (the total generation amount) is calculated according to the engine operating condition, such as the engine rotational speed NE and the fuel injection amount QINJ. Alternatively, another main DPF total accumulation amount GDPFTMa may be calculated by the following method. That is, a pressure difference sensor for detecting a pressure difference DPDPFM between the upstream pressure and the downstream pressure of the DPF 14 may be provided, and the main DPF total accumulation amount GDPFTMa may be calculated by the same method as steps S302-S304 of FIG. 8. The main DPF total accumulation amount GDPFTMa coincides with the main DPF total accumulation amount GDPFTM when no leak is present in the main DPF 14, but becomes less than the main DPF total accumulation amount GDPFTM when the leak is present in the main DPF 14. In this modification, the trapping rate CE is calculated by the following equation (9).

$$CE = DGDPFTMa/(DGDPFTMa + DGDPFTS) \quad (9)$$

Further, in order to eliminate the influence of the exhaust gas pulsation, an accumulated value of the detected pressure difference DPDPFS, or an averaged value of the detected pressure difference DPDPFS may be used for the failure diagnosis. Further, the detected pressure difference DPDPFS may be subjected to a filtering process for removing the frequency component corresponding to the frequency of the exhaust gas pulsation, and the filtered pressure difference may be used for the failure diagnosis.

Further, the detected pressure difference DPDPFS may be compared with a corresponding determination threshold value DPDPFSTH, and it may be determined that the main DPF 14 fails when the pressure difference DPDPFS becomes greater than the determination threshold value DPDPFSTH.

Further, in the first embodiment, the particulate accumulation amount (particulate generation amount) GDPFM may be calculated according to the engine operating condition (e.g., the engine rotational speed NE, the fuel injection amount QINJ, etc.), and the trapping rate CE may be calculated by the following equation (10). In this modification, when the regeneration process is performed, the particulate accumulation amount GDPFM is updated in the decreasing direction.

$$CE=(GDPFM-GDPFS)/GDPFM \quad (10)$$

The exhaust gas purifying apparatus of the present invention can be applied also to a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:
   first filtering means for trapping particulates in exhaust gases from said engine;
   second filtering means for failure detection, said second filtering means being disposed downstream of said first filtering means;
   trapping state detecting means for detecting the trapping state of said second filtering means; and
   filter diagnosing means operatively coupled to said trapping state detecting means, for diagnosing the filtering capability of said first filtering means based on the detection result of said trapping state detecting means,
   wherein said trapping state detecting means includes a temperature sensor for detecting the temperature of said second filtering means, wherein the trapping state of particulates in said second filtering means is detected based on the temperature detected by said temperature sensor during a filter regeneration process for burning the particulates trapped in said first filtering means.

* * * * *